United States Patent
Menschner (10) Patent No.: US 10,833,889 B2
(45) Date of Patent: Nov. 10, 2020

(54) METHOD AND DEVICE FOR MONITORING CONTROL SYSTEMS

(71) Applicant: RHEBO GMBH, Leipzig (DE)

(72) Inventor: Martin Menschner, Leipzig (DE)

(73) Assignee: RHEBO GMBH, Leipzig (DE)

( * ) Notice: Subject to any disclaimer, the term of this patent is extended or adjusted under 35 U.S.C. 154(b) by 0 days.

(21) Appl. No.: 15/928,374

(22) Filed: Mar. 22, 2018

(65) Prior Publication Data

US 2018/0270082 A1    Sep. 20, 2018

Related U.S. Application Data

(63) Continuation of application No. PCT/EP2016/001584, filed on Sep. 22, 2016.

(30) Foreign Application Priority Data

Sep. 22, 2015  (DE) .................. 10 2015 012 064
Sep. 22, 2015  (DE) .................. 10 2015 012 065

(51) Int. Cl.
*H04L 12/413*    (2006.01)
*H04L 12/26*    (2006.01)
(Continued)

(52) U.S. Cl.
CPC ........ *H04L 12/413* (2013.01); *G05B 19/4185* (2013.01); *H04L 43/028* (2013.01);
(Continued)

(58) Field of Classification Search
None
See application file for complete search history.

(56) References Cited

U.S. PATENT DOCUMENTS 7,123,590 B2 * 10/2006 Mir ...................... H04L 1/0014
370/252
7,644,150 B1     1/2010 Nucci
(Continued)

FOREIGN PATENT DOCUMENTS

DE    102010033229 A1    2/2002
DE         10151115 A1    5/2003
WO    WO2014067540 A1    5/2014

OTHER PUBLICATIONS

"Network Traffic Features for Anomaly Detection in Specific Industrial Control System Network", www.mdpi.com/journal_future_internet_article, Jun. 27, 2013.

*Primary Examiner* — Xavier S Wong
(74) *Attorney, Agent, or Firm* — Von Rohrscheidt Patents (57) ABSTRACT

A method for monitoring control systems, a device for monitoring control systems and a corresponding computer program product, wherein the control system has at least one communication network and at least two communication end points connected to the communication network, which communication end points exchange data via the communication network, wherein the data exchanged between the communication end points is acquired and after comparing the currently acquired data with previously acquired data, an alert is raised when new data is acquired. As a result, a monitoring is provided which recognizes errors particularly quickly and reliably in the context of communication in control systems, in particular in industrial control systems. These errors may subsequently be coupled with a quality management to determine whether quality losses correlate with such recognized errors.

15 Claims, 5 Drawing Sheets

(51) Int. Cl.
    *H04L 29/06* (2006.01)
    *G05B 19/418* (2006.01)
    *H04L 12/40* (2006.01)

(52) U.S. Cl.
    CPC .............. *H04L 43/18* (2013.01); *H04L 63/08* (2013.01); *G05B 2219/31094* (2013.01); *H04L 63/123* (2013.01); *H04L 2012/4026* (2013.01); *H04L 2463/121* (2013.01)

(56) References Cited

U.S. PATENT DOCUMENTS

| | | | | |
|---|---|---|---|---|
| 9,811,600 | B2* | 11/2017 | Mashinsky | G06F 16/958 |
| 2002/0116537 | A1* | 8/2002 | Fuehrer | G06F 13/3625 |
| | | | | 719/313 |
| 2004/0059933 | A1 | 3/2004 | Levy | |
| 2004/0177141 | A1* | 9/2004 | Foody | H04L 41/5054 |
| | | | | 709/224 |
| 2004/0260674 | A1* | 12/2004 | Primm | G06F 11/3058 |
| 2005/0232224 | A1* | 10/2005 | Belschner | H03M 13/43 |
| | | | | 370/351 |
| 2007/0214504 | A1* | 9/2007 | Milani Comparetti | |
| | | | | H04L 63/1408 |
| | | | | 726/23 |
| 2010/0150009 | A1 | 6/2010 | Mangs et al. | |
| 2011/0314338 | A1* | 12/2011 | Erickson | G06F 11/3632 |
| | | | | 714/37 |
| 2012/0079101 | A1* | 3/2012 | Muppala | H04L 63/0236 |
| | | | | 709/224 |
| 2013/0132730 | A1 | 5/2013 | Falk | |
| 2014/0188933 | A1* | 7/2014 | Chomik | H04L 67/125 |
| | | | | 707/770 |
| 2015/0101051 | A1* | 4/2015 | Chamley | G06K 19/07363 |
| | | | | 726/23 |
| 2016/0036602 | A1* | 2/2016 | Forguites | H04L 12/4637 |
| | | | | 370/404 |

* cited by examiner

METHOD AND DEVICE FOR MONITORING CONTROL SYSTEMS

RELATED APPLICATIONS

This application is a continuation of International Patent Application PCT/EP2016/001584 filed on Sep. 22, 2016 claiming priority from German Patent Applications DE 10 2015 012 064.6 filed on Sep. 22, 2015; and DE 10 2015 012 065.4 filed on Sep. 22, 2015

FIELD OF THE INVENTION

The present invention relates to a method for monitoring control systems and a device for monitoring control systems.

BACKGROUND OF THE INVENTION

Such control systems are mainly used in industrial production and logistics, and this is also the main application field of the present invention.

The production processes and storage and transport processes are controlled and monitored with the help of such control systems. Up until now, for example, it has been monitored whether a certain device that is integrated into the control system performs its operation properly or whether errors occur, wherein parameters of the device were queried and monitored.

In this day and age modern control systems are, for example, based on Ethernet and the communication in the control system takes place, for example, via IP (Internet Protocol). Although this is very easy to handle, there is also a clear vulnerability not only with respect to external attacks, but also with respect to internal data loss during communication. Such errors in the control system have not been satisfactorily recognized up until now.

BRIEF SUMMARY OF THE INVENTION

The object of the present invention is therefore to enable monitoring of control systems, in particular industrial control systems, which recognizes errors in the context of communication, in particular, which reliably recognizes the errors mentioned above.

This object is achieved by a method for monitoring a control system, wherein the control system includes at least one communication network and at least two communication end points connected to the at least one communication network, the method comprising the steps: exchanging data between the at least two communication end points via the at least one communication network; acquiring data exchanged between the at least two communication end points; and after comparing currently acquired data with previously acquired data, raising an alert when new data is acquired.

The object is also achieved by a device for monitoring a control system, wherein the control system includes at least one communication network and at least two communication end points connected to the at least one communication network, wherein the at least two communication end points exchange data via the communication network, wherein devices are provided that are configured to acquire data exchanged between the communication end points data and devices are provided configured to compare currently acquired data with previously acquired data, wherein the devices are configured to raise an alert when new data is acquired.

The object is also achieved by a computer program product that is stored on a computer readable medium comprising computer readable program devices configured to cause the computer to execute a method according to claim 1 when the program device is executed on the computer.

Advantageous embodiments are provided in the subsequent description and the dependent claims.

The inventors have recognized that the object of the present invention can be solved in a surprisingly simple way by machine-learning the communication and then newly occurring communication is potentially evaluated as an error and this takes place by a corresponding alert. This solution is based on the assumption that, in control systems, communication always occurs in a deterministic manner and that this determination is interrupted only in the event of errors or faults. In fact, for example, in an industrial control system of a production line, the internal communication takes place in constantly recurring paths, wherein individual parameters may possibly change, for example, in terms of number of pieces, etc., however, the device communicating with each other, for example, and the nature of their communication does not change, so that new communication is initially potentially faulty. For example, industrial control systems are based on standard Ethernet. However, sometimes data congestion or data loss may occur in this case, which would be recognized by the present invention.

The method according to the invention for monitoring control systems, in particular industrial control systems, wherein the control system has at least one communication network and at least two communication end points connected to the communication network, which exchange data via the communication network, is therefore characterized in that the data exchanged between the communication end points is acquired and after comparison of the currently acquired data with previously acquired data, an alert is raised when new data is acquired.

"Communication networks" in the sense of the present invention can be both wired and non-wired networks over which data is communicated. For example, it may be an Ethernet based communication network.

"Communication end point" in the sense of the present invention are points in the communication network at which data are generated, processed, received and forwarded. These may for example be devices. Such communication end points usually have a device number (hardware address, MAC address) and an application protocol address (IP address). Simple lines are therefore not communication end points, as opposed to devices such as production machines, network interfaces, servers and the like.

"Application protocols" do not concern basic protocols of communication, such as Ethernet, Internet Protocol (IP) or Transmission Control Protocol (TCP), but rather are so-called Layer 7 protocols according to the OSI model of data communication. Application protocols include, for example, "Profinet" from Siemens, "Modbus" or "Ethercat".

At least two "communication end points" are involved in a "communication", but more than two "communication end points" can also be involved in a communication. If two communication end points are involved, then it is a one-to-one communication ("unicast"), if a communication end point communicates with a selection of communication end points, then it is a one-to-many communication ("multicast"), and if a communication end point communicates with all other communication end points, then it is a one-to-all communication ("broadcast").

"Data" in the sense of the present invention are all types of data connections or packets of data connections in the context of communication in the control system.

"Alerts" in the sense of the present invention are not only character-based messages but also optical and/or acoustic signals as well as control signals for activating certain automated processes.

In a advantageous embodiment, it is provided that there is monitoring outside the existing communication network, i.e., that the data acquisition does not take place in the communication network itself, but rather outside of it. Although there is a connection to the communication network to capture the data, however, the acquisition, thus storage, evaluation and the like of the data takes place independently of the existing communication network. "Outside" in a broader aspect of this invention thus means that these are means without the presence of which the communication network is still fully functional for the operation of the control system.

In an advantageous embodiment, it is provided that the data is passively captured. Thus, there is no active data capture and forwarding or processing, as would be the case, for example, with a proxy server. As a result, the control system remains very insusceptible to interference.

In an advantageous embodiment, the exchanged data are analyzed for communication parameters contained therein, wherein the communication parameters comprise preferably at least one parameter from the group:
hardware address of the communication end point involved in the communication,
IP address of the communication end point involved in the communication,
application protocol with which the data are exchanged and
message that is communicated with the exchanged data.

As a result, a more precise specification of the communication can thereupon be made as to whether the communicated new data has an error relevance, or whether it is, for example, only device-specific changed parameters that do not affect the functioning of the entire control system. It is preferably provided that the application protocol is selected from the group: Profinet, Modbus, Ethercat or device-specific protocols of communication end points. Of course, the IP address can only be analyzed if IP data traffic is actually concerned. These communication parameters may not always be present for each data traffic, but they may be.

In an advantageous embodiment, it is provided that combinations for the definition of data types are formed from the analyzed communication parameters. The data types in this case preferably include at least one combination of communication parameters from the group:
hardware address of the communication end point involved in the communication,
IP address of the communication end point involved in the communication,
application protocol with which the data are exchanged,
hardware address of the communication end point involved in the communication combined with the application protocol with which the data are exchanged,
IP address of the communication end point involved in the communication combined with the application protocol with which the data are exchanged,
combination of the hardware addresses of the communication end points involved in the communication,
combination of the IP addresses of the communication end points involved in the communication,
combination of the hardware addresses of the communication end points involved in the communication and the application protocol with which the data are exchanged,
combination of the IP addresses of the communication end points involved in the communication and the application protocol with which the data are exchanged,
combination of the hardware address and the IP address of the communication end point involved in the communication,
combination of the hardware address and the message of the communication end point involved in the communication,
combination of the IP address and the message of the communication end point involved in the communication,
combination of the hardware addresses of the communication end points involved in the communication and the message and
combination of the IP addresses of the communication end points involved in the communication and the message. These data types particularly indicate faults or errors in the control system particularly well and make the nature of the error or fault very easily recognizable.

It is then particularly advantageous for the alert to be raised upon acquisition of such a new data type. Thus, an alert is not necessarily raised for every type of new communicated data, but only if a new data type is recognized. In this context, "new data type" does not only mean that, as part of the ongoing monitoring, a previously unknown kind of data type, i.e., a previously unanalyzed combination of communication parameters, is determined, but rather, primarily, that the content of the data type is new, so although the type of communication parameters contained was known, the content, however, of the communication parameters is new, so it is a new expression of a known data type.

Since not only a uniform application protocol must be present in a control system but, for example, different standard or proprietary application protocols can exist in different areas of the control system, it is provided according to an advantageous embodiment that for analyzing the application protocol used, the exchanged data are examined heuristically and/or on the patterns associated with a known application protocol. Through this, the application protocol used to communicate the new data can be determined in order to determine the other communication parameters. This protocol recognition makes use of several features of a data connection or its packets in order to make a statement about which application protocol is used in the communication. Primarily, the payload of the packet is inspected by means of deep packet inspection to determine the underlying application protocol by finding specific patterns or by using heuristics. Even unknown application protocols can be identified individually with the help of this analysis.

In an advantageous embodiment, it is provided that the exchanged data are decoded with the aid of the application protocol to analyze the communicated message. A protocol decoder is preferably used for decoding the message from the data, wherein a separate protocol decoder belongs to each application protocol. In this case, the message type of the message is preferably used as a communication parameter instead of the message, the message type being analyzed from the message, wherein the message type is in particular one from the group: error message, command to authenticate, command to read data, command to write data, and command to synchronize time of two communication end points. A significant simplification of the monitoring is also achieved through this because now the content of the message no longer needs to be analyzed in detail, but rather only the type of the message is used for monitoring. If no suitable protocol decoder is present, then the application protocol can not be determined or, if necessary, a corresponding decoder is added into the monitoring, wherein this process could proceed manually or automatically.

On the other hand, it can also be provided that the application protocol can indeed be recognized, but for complexity reasons or due to lack of demand by the user, the protocol decoder is not implemented, so that although the application protocol can be recognized, the message or the message type cannot be read.

In an advantageous embodiment, it is provided that a hash value is formed from the new data or the new data type by means of a hash function. Since such hash values are unique, the monitoring can be considerably accelerated, since it is no longer necessary to compare the data or data types in the context of monitoring, but only their hash values as indexing.

In an advantageous embodiment, it is provided that the new data, the new data types and/or the associated hash values are stored in a memory, preferably with an indexed data structure, wherein the new data, the new data types or the associated hash values are preferably stored chronologically, in particular together with a timestamp. As a result, an exact assignment to the real progress of the processes in the control system is obtained.

In an advantageous embodiment, it is provided that, in addition, the timestamp is renewed for the data, data types or hash values which were not recognized as new, but have already been stored beforehand, since then an exact mapping of the control system results at the time of the alert is produced.

In an advantageous embodiment, it is provided that for each data, each data type or each hash value, the timestamps are stored for a predetermined period, then there can be a monitoring of failing communication, to recognize errors and faults, which, for example, are based on the failure of a device in the control system. This predetermined period of time may be predetermined but fixed or the storage may take place until an authorized user deletes the storage in order, for example, to take into account the changed communication after a conversion and restart of the control system.

In addition, it can be provided that the new data, the new data types or the associated hash values are deleted again from the memory after a first definable time, wherein this first definable time is preferably at most 1 year, preferably at most 4 weeks, in particular 1 to 2 weeks. An updating of the monitoring fundamentals can be performed through this. On the other hand, the time may not be limited, so that no such update takes place.

In an advantageous embodiment, it is provided that the exchanged data are analyzed for an absence of communication. For example, there are cyclic communication events in which data is periodically exchanged to ensure protocol compliance at periodically recurring intervals based in the context of a particular transmission protocol. After a possible analysis of the periodicity of recorded data, it can be checked whether such data are exchanged properly, possibly within the context of a certain temporal blurring, or whether this communication is absent, which then raises an alert as a deviation from the normal case.

Independent protection is claimed for the device according to the invention for monitoring control systems, wherein the control system has at least one communication network and at least two communication end points connected to the communication network, which communication end points exchange data via the communication network, wherein the device is characterized in that means are provided for acquiring the data exchanged between the communication end points and means are provided for comparing the currently acquired data with previously acquired data, which are configured to raise an alert when new data are acquired.

In an advantageous embodiment, it is provided that the sensor is a passive element. This means that the sensor only passively captures the communication, but does not actively process it and does not forward it within the monitored communication network, as, for example, a proxy server does. As a result, the control system remains very insusceptible to interference.

In an advantageous embodiment, it is provided that the device is adapted to perform the method according to the invention.

In an advantageous embodiment, it is provided that at least one sensor is provided, which is connected to the communication network and is adapted to acquire the exchanged data without changing this exchanged data. Such a sensor can be realized as a hardware device but also as software, for example, as an application, or as a mixed form. The monitoring can then take place entirely or at least partially in this sensor or even completely or partially centrally, for example on a server.

These "sensors" may be devices in their own right or just points for passively capturing data traffic from the communications network. For example, the replication ports of a network tap may embody such "sensors."

In an advantageous embodiment, it is provided that the sensor is configured to calculate hash values by means of a hash function, wherein the sensor is preferably adapted to store the hash values, wherein the memory in particular has an indexed data structure.

In an advantageous embodiment, it is provided that the sensor is configured to provide at least the new data to a quality management, wherein the device is adapted to analyze the new data for communication parameters contained therein, wherein the communication parameters preferably comprise at least one parameter from the group:

hardware address of a communication end point,

IP address of a communication end point, application protocol with which the data are exchanged, and message that is communicated with the exchanged data.

Then not only can monitoring for errors and faults be taken on, but deeper insights into the control system are made possible for the purpose of quality management.

Further, the invention may be realized in the form of a computer program product that is accessible from a computer usable or computer readable medium and is provided with program code for use by a computer or for use in connection with a computer or any command execution system. Therefore, independent protection is also claimed for a computer program product that is stored on a computer readable medium and which includes computer readable program means for causing the computer to execute the method according to the invention when the program means are executed on the computer.

For the purposes of this specification, computer usable or computer readable media may be any apparatuses or devices that contain, store, communicate, propagate, or transport the program for use by the command execution system or in connection with the command execution system, device or apparatus. In this case, mobile communication means, such as mobile phones, tablet computers and the like may also be used.

The medium may be an electronic, magnetic, optical, electromagnetic, infrared or semiconductor system (or device or apparatus) or a propagation medium. Examples of a computer-readable medium include a semiconductor or solid state memory, magnetic tape, a removable computer diskette, a random access memory (RAM), a read-only memory (ROM), a fixed magnetic disk, and an optical disk. Present examples of optical disks include compact disk read-only memory (CD-ROM), compact disk read/write (CD-R/W) and DVD. The medium may be a non-transitory medium.

A data processing system capable of storing and/or executing the program code includes at least one processor directly or indirectly connected to at least one memory element through a system bus. The storage element may include local memory which is operative during the current execution of the program code, mass storage, and buffer memory which provide temporary storage of at least some program code to reduce the number of calls for the code from the mass storage during execution.

Input/output or I/O devices, which may include, but are not limited to, keyboards, displays, pointing devices, etc., may be coupled to the system either directly or through intermediary I/O controllers.

Network adapters may also be connected to the system to enable the data processing system to couple with other data processing systems or remote printers or storage devices through intermediary private or public networks. In this context, modems, cable modems, or Ethernet cards are just a few examples of the currently available types of network adapters.

BRIEF DESCRIPTION OF THE DRAWINGS

The characteristics and further advantages of the present invention will become apparent in the following with reference to the description of a advantageous embodiment in conjunction with the figures. Shown purely schematically.

DETAILED DESCRIPTION OF THE INVENTION

Figure 1:
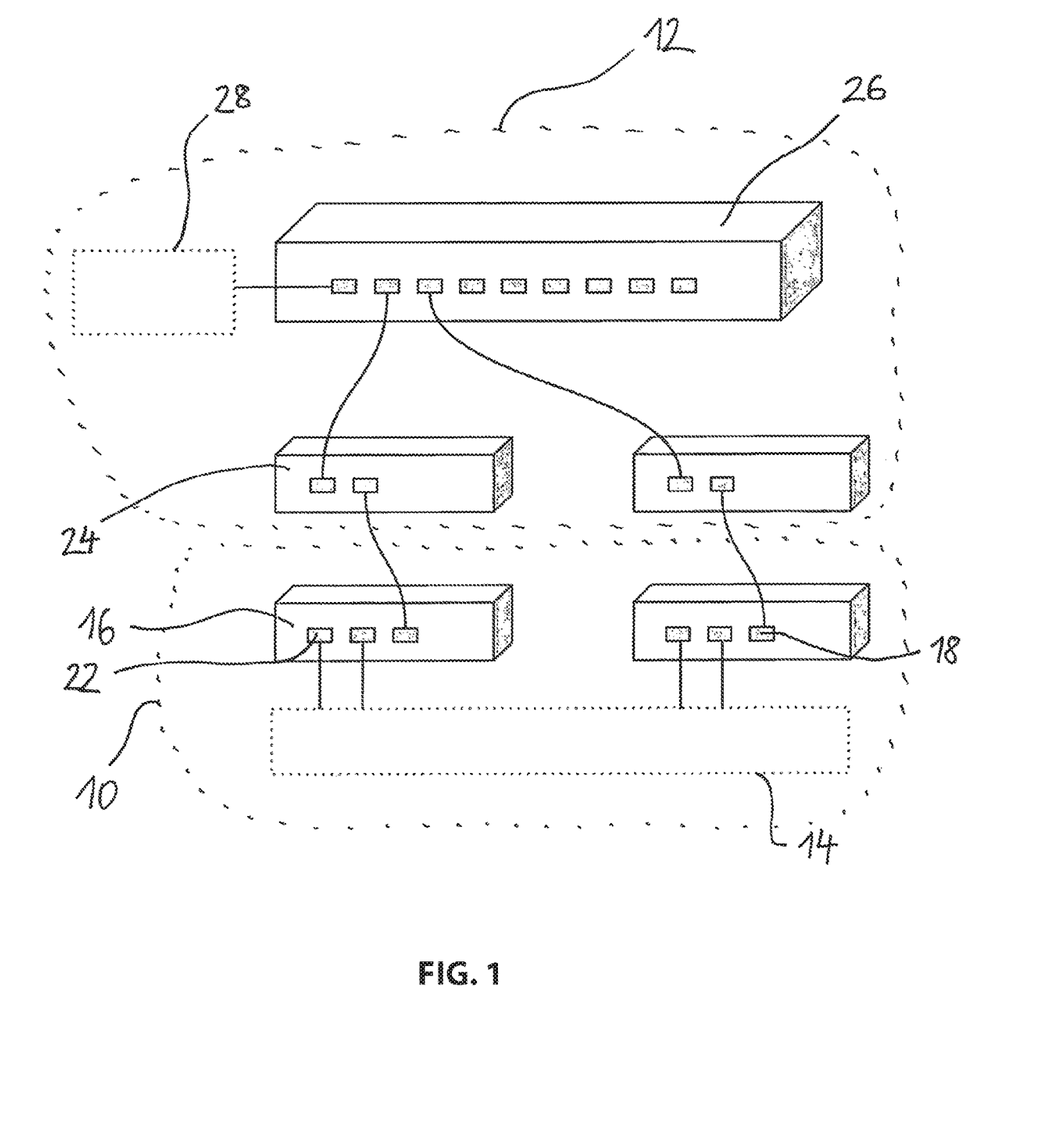
FIG. 1 illustrates the monitoring according to the invention of a control system in a first advantageous embodiment.

A first advantageous embodiment of the monitoring for a control system 10 according to the invention by means of the device 12 for monitoring the control system 10 is shown purely schematically in FIG. 1.

It should be recognized that the control system 10 is an industrial control system 10 that is used, for example, as part of a production line (not shown) to control and synchronize with each other the actions of individual devices (not shown) of the production line. This control system 10 is based, for example, on the standard Ethernet. In this case, the devices of the production line are arranged, for example, as a star-shaped communication network 14.

At various points, in the present case at the nodes of the star-shaped network 14 so-called switches 16 are arranged, which are equipped with mirror ports 18. These mirror ports 18 read the aggregated data traffic 20 of the other ports 22, i.e., the data 20 communicated in the control system 10 (see FIG. 4) purely passively without changing these data 20 and feed these data 20 to the sensors 24 connected to the switches 16, which sensors in turn are connected to a central control unit 26. This central control unit 26 is connected to an operating unit 28, with which, on the one hand, updates of the device 12 and, on the other hand, its configuration and the evaluation of the obtained results is performed.

The sensors 24 may be physically present or also as software, for example, in the form of applications. They forward the data traffic 20 to the control unit 26 so that it can be centrally arranged. In addition, they effect a multiplication of the distribution possibilities of the recorded data traffic. In addition, they form a buffer for the data 20, so that no confusion and no loss of data occur. In this case, the clock rate of the mirror port 18 should preferably be as high as the sum of the clock rates of the mirrored ports 22. In addition, the sensors 24 conduct a packaging of the data 20 so that no subsequent relaying to the addressee of the data is attempted thereafter. This package is then removed first in the analysis of the data 20.

If necessary, an additional switch level (not shown) can be inserted between the sensors 24 and the central control unit 26. In addition, besides the evaluation of the data traffic 20 and a possible quality management, the software for the sensors 24 can also operate in the central control unit 26.

Figure 2:
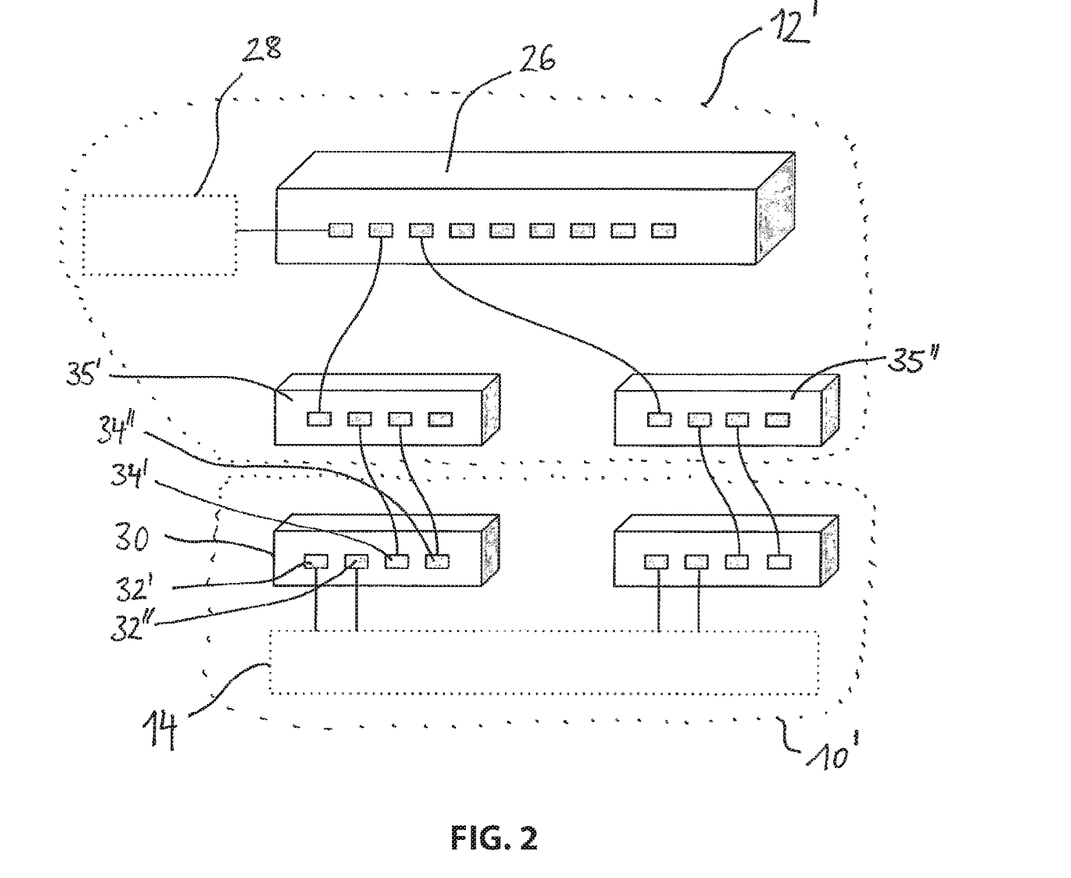
FIG. 2 illustrates the monitoring according to the invention of a control system in a second advantageous embodiment.

In contrast to FIG. 1, no switches are used in the monitoring device 12' of FIG. 2, but rather so-called network taps 30, in which each port 32', 32" is assigned its own port 34', 34", which passively passes on the data 20 of the respective port 32', 32" to the sensor 35', 35" independently of the rest of the data traffic 20 running in the control system 10'.

Figure 3:
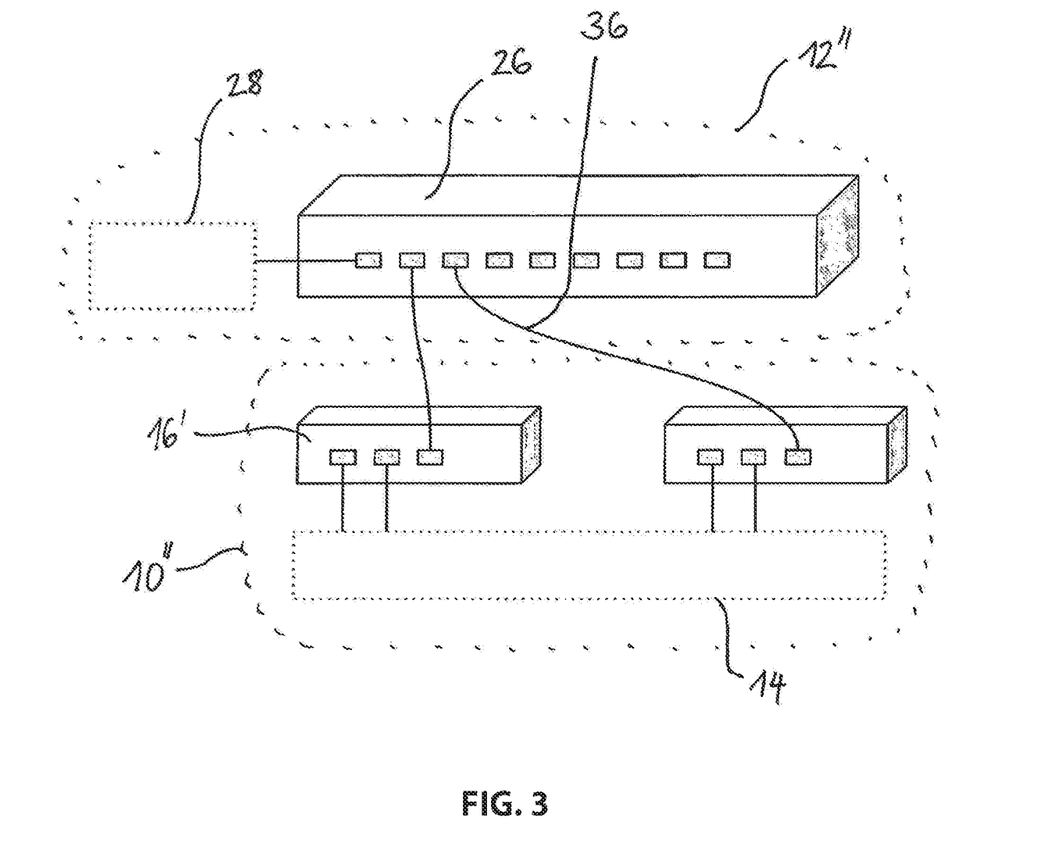
FIG. 3 illustrates the monitoring according to the invention of a control system in a third advantageous embodiment.

In FIG. 3, in this monitoring device 12", switches 16' are in turn used with mirror ports 18, however, no dedicated sensors are used here, but rather the data traffic 20 in the control system 10" is forwarded directly from the switches 16' to the central control unit 26, for example, via throw cable 36 or by radio. The sensors are thus embodied here by the mirror ports 18 and the throw cable 36.

Figure 4:
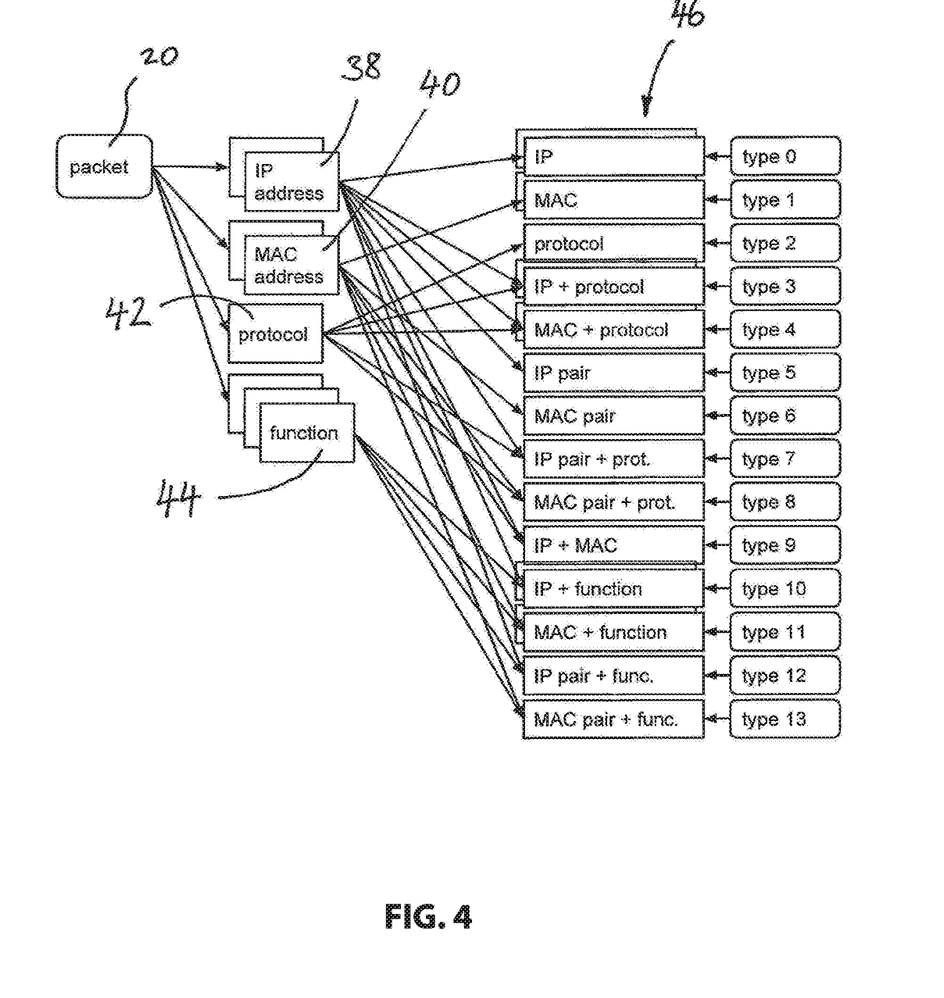
FIG. 4 illustrates a block diagram representation of the analysis of the data types from the acquired data.

It can be seen in FIG. 4 that the data 20 read out by the sensors 24, 35', 35" are first analyzed for the communication parameters contained in the data 20, namely the IP addresses 38 involved and MAC addresses 40 of the devices of the production line involved in the communication, the communication protocol 42 used as part of the communication and the message actually exchanged in the context of communication. This can concern one or more messages.

In the example shown, it is assumed that two devices each participate in the communication, for which reason two different IP addresses 38 and MAC addresses 42 are analyzed. The application protocol 44 is either a proprietary device-specific protocol or, for example, the application protocol Profinet from Siemens. The exchanged messages relate, for example, to the request for synchronization, error messages, the request for or the subsequent execution of an authentication or the like. In the context of the advantageous analysis, the actual messages, i.e., the exact contents of the messages, are not processed, but rather the underlying message types 44 are determined from these messages, i.e., synchronization commands, error messages, authentication commands and the like. Different message types 44 can occur, as shown in FIG. 4.

14 different data types 46 (type 0 to type 13) are now generated from these communication parameters 38, 40, 42, 44, in which these communication parameters 38, 40, 42, 44 are used individually and/or combined with each other. In turn, these data types 46 are either simply present, such as type 3, or doubly, such as type 9, based on the two devices communicating with each other. Depending on the number of message types 44, the types 10, 11, 12 and 13 are correspondingly multiplied.

Figure 5:
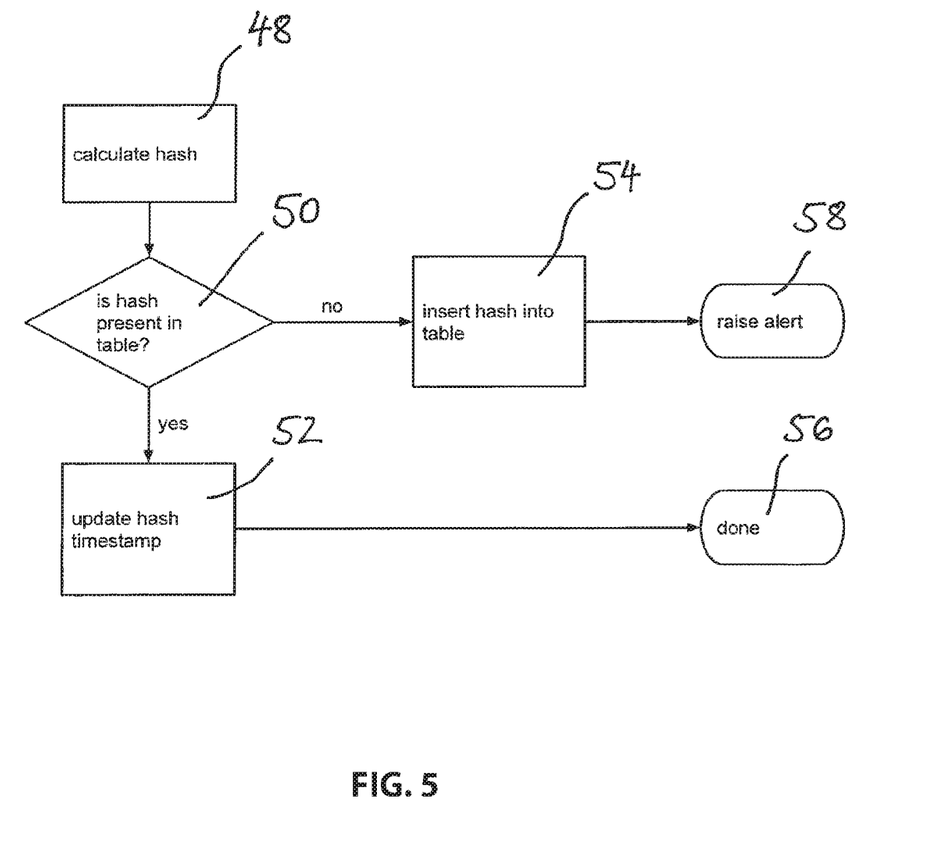
FIG. 5 illustrates a flowchart representation of raising an alert.

According to FIG. 5, the associated hash values 48 are then calculated from each data type 46 as soon as it has been acquired. Then, in a memory (not shown) that may be arranged in the sensor 24, 35', 35" itself (see FIGS. 1 and 2) or in the central control unit 26, 50, there is comparison whether this hash value already exists and the timestamp of this hash value is updated 52 if it already exists, or the hash value is stored with the current timestamp 54 if the hash value was not yet present in the memory.

Nothing further is done 56 in the case where the timestamp was updated because the hash value already existed in memory 52. On the other hand, if a new hash value is stored in memory 54, then there was a completely new type of communication and an alert 58 is raised which indicates that it is a completely new communication that has not yet occurred in the control system 10. For example, two devices now communicate with each other, which have never done so before (type 5), or message types are exchanged between two devices that have never before been exchanged between these devices (type 12). Since the communication in a control system 10 is deterministic and no new, unexpected communication can occur during normal operation, this reported new communication could be an error, a fault or even an unauthorized external attack.

The raised alert 58 is then examined by the monitoring personnel, depending on the configuration of the monitoring according to the invention, as to whether there is actually a critical state of the control system 10 and possibly, what is to be done. Or the alert is associated with an automatism that independently performs certain actions to secure the control system 10, which in extreme cases can include its controlled shutdown and switching off.

The alert 58 may contain only the reference to the determined new hash value or also detailed information about the communication parameters or the data types or the communicated messages. In addition, these alerts 58 can be passed on to a suitable quality management. There, a comparison between the determined quality and communication faults can then be made, for example, to be able to attribute quality losses to certain faults in the communication or even determine that certain communication errors are occurring, but which have no influence on the achieved quality. In the latter case, the alert 58 could then be omitted in the future and the underlying communication state can be regarded as the standard case of the control system.

Finally, if it turns out that the new hash value is linked with an undesired state of the control system 10, this hash value can be deleted from the memory after a performed evaluation or executed automatism, so that this state again can be recognized next time as a deviation from the standard state via this hash value.

It can be recognized that the monitoring according to the invention takes place in that the communication usually occurring in the control system 10 is learned, that is typed and stored, and then, when a new type of communication occurs, an alert 58 is generated which indicates this. In this context, the content of the communication essentially does not matter, but rather depends only on whether the communication is typical, that is, would occur in a normal operation. This will immediately detect anomalies in the communication.

The monitoring according to the invention can now be used in two different ways. Either a tuning process is performed, in which all communication is stored and only then is the monitoring "armed" or monitoring is performed from the beginning. The first variant is not expensive in terms of time, but there is also the danger that anomalous communication is stored and thus treated as normal, so that their occurrence would no longer be reported later. The second variant is more time-consuming, since each new communication leads to an alert 58, which is then to be monitored by the monitoring personnel, but errors are thus essentially completely ruled out.

In contrast to the previously known monitoring of parameters of individual devices, these parameters are now less or not at all interesting. Instead, there is a monitoring of the overall communication in the control system to ensure its proper functioning. The monitoring is particularly fast and resource-saving due to the pure hash value comparisons 36. Of course, instead of hash values 50, other identifiers, which allow a unique association, may be used.

From the above description, it has become clear that the present invention provides a monitoring which, in control systems, in particular in industrial control systems, recognizes errors particularly quickly and reliably in the context of communication. These errors may subsequently be coupled with quality management to determine if quality losses correlate with such recognizes errors.

Unless otherwise specified, all features of the present invention may be freely combined with each other. The features described in the description of the figures can, unless specified otherwise, also be freely combined with the other features as features of the invention. In this case, objective features of the device can also be used in the context of the method and method features in the context of the device.

REFERENCE NUMERALS AND DESIGNATIONS 10, 10', 10" control system
12, 12', 12" device for monitoring the control system 10
14 star-shaped communication network
16 switches
18 mirror ports of the switches 14
20 data traffic, data
22 ports of the switches 16
24 sensors
26 central control unit
28 operating unit of the central control unit 26
30 network taps
32', 32" ports of the network taps 30
34', 34" ports of the network taps 30, replication ports
36 throw cable
38 IP addresses
40 MAC addresses
42 application protocol
44 message types
46 data types (type 0 to type 13)
48 calculation of the hash values
50 comparison of hash value with memory
52 updating hash value 54 providing hash value with current timestamp and saving
56 end
58 raising of alert

What is claimed is:

1. A method for monitoring a control system,
wherein the control system includes at least one communication network and at least two communication end points connected to the at least one communication network, the method comprising the steps:
exchanging data between the at least two communication end points via the at least one communication network;
acquiring data exchanged between the at least two communication end points; and
after comparing a content of currently acquired data with a content of previously acquired data, raising an alert when new data is acquired,
wherein the exchanging data is deterministic such that no new data is generated by the at least two communication endpoints during normal operations,
wherein the new data types or the associated hash values are stored in a memory with an indexed data structure, and
wherein the new data, the new data types or the associated hash values are stored chronologically.

2. The method according to claim 1, wherein the exchanged data is analyzed for communication parameters contained therein.

3. The method according to claim 2, wherein the communication parameters include at least one parameter selected from the group consisting of:
a hardware address of a communication end point involved in the communication;
an IP address of a communication end point involved in the communication;
an application protocol by which the data is exchanged; and
a message that is communicated with the exchanged data.

4. The method according to claim 3, wherein the application protocol is a layer 7 protocol according to the Open Systems Interconnection (OSI) model.

5. The method according to claim 4, wherein the application protocol is selected from the group consisting of Profinet, Modbus, Ethercat, and device specific protocols of communication end points.

6. The method according to claim 2, wherein combinations for defining data types are formed from the analyzed communication parameters.

7. The method as in claim 6, wherein the data types include at least one combination of communication parameters selected from the group consisting of:
a hardware address of the communication end point involved in the communication;
an IP address of the communication end point involved in the communication;
an application protocol with which the data are exchanged;
a hardware address of the communication end point involved in the communication combined with the application protocol with which the data are exchanged;
an IP address of the communication end point involved in the communication combined with the application protocol with which the data are exchanged;
a combination of the hardware addresses of the communication end points involved in the communication;
a combination of the IP addresses of the communication end points involved in the communication;
a combination of the hardware addresses of the communication end points involved in the communication and the application protocol with which the data are exchanged;
a combination of the IP addresses of the communication end points involved in the communication and the application protocol with which the data are exchanged;
a combination of the hardware address and the IP address of the communication end point involved in the communication;
a combination of the hardware address and the message of the communication end point involved in the communication;
a combination of the IP address and the message of the communication end point involved in the communication;
a combination of the hardware addresses of the communication end points involved in the communication and the message; and
a combination of the IP addresses of the communication end points involved in the communication and the message,
wherein the alert is raised upon acquisition of a new data type.

8. The method according to claim 2,
wherein the exchanged data or patterns associated with a known application protocol is examined heuristically to analyze the application protocol used.

9. The method according to claim 2, wherein the exchanged data is decoded with the aid of the application protocol to analyze the communicated message.

10. The method according to claim 9, wherein a message type of the message is used as a communication parameter instead of the message so that the message type is analyzed from the message.

11. The method according to claim 10, wherein the message type is selected from the group consisting of: an error message, a command to authenticate, a command to read data, a command to write data and a command to synchronize time of two communication end points.

12. The method according to claim 1, wherein a hash value is formed by a hash function from the new data or the new data type.

13. The method according to claim 1, wherein the new data, the new data types or the associated hash values are stored in a memory.

14. The method according to claim 1, wherein the new data, the new data types or the associated hash values are stored chronologically together with a timestamp.

15. The method according to claim 14, wherein the timestamps are updated when the data, the data types or hash values reoccur, wherein the timestamps are collected for each data, data type or hash value.

* * * * *